United States Patent
Lam

(10) Patent No.: US 9,832,117 B2
(45) Date of Patent: Nov. 28, 2017

(54) MULTI-CHASSIS CASCADING APPARATUS

(71) Applicant: Huawei Technologies Co., Ltd., Shenzhen (CN)

(72) Inventor: Wan Lam, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 14/143,750

(22) Filed: Dec. 30, 2013

(65) Prior Publication Data

US 2014/0112337 A1    Apr. 24, 2014

Related U.S. Application Data

(63) Continuation of application No. PCT/CN2011/078785, filed on Aug. 23, 2011.

(51) Int. Cl.
*H04L 12/775* (2013.01)
*H04L 12/933* (2013.01)
*H04L 12/931* (2013.01)

(52) U.S. Cl.
CPC .............. *H04L 45/58* (2013.01); *H04L 49/10* (2013.01); *H04L 49/40* (2013.01)

(58) Field of Classification Search
CPC ......... H04L 45/58; H04L 49/10; H04L 49/40; H04L 49/15; H04L 49/101; H04L 12/40097
See application file for complete search history.

(56) References Cited

U.S. PATENT DOCUMENTS

| | | | |
|---|---|---|---|
| 7,552,262 B1 * | 6/2009 | Turner et al. | 710/302 |
| 7,738,757 B1 | 6/2010 | Pakravan et al. | |
| 8,705,500 B1 * | 4/2014 | Aybay et al. | 370/338 |
| 2007/0248086 A1 | 10/2007 | Petersen | |
| 2008/0044181 A1 * | 2/2008 | Sindhu | 398/49 |
| 2009/0003327 A1 | 1/2009 | Zang et al. | |

(Continued)

FOREIGN PATENT DOCUMENTS

| CN | 101098238 A | 1/2008 |
|---|---|---|
| CN | 101132286 | 2/2008 |

(Continued)

OTHER PUBLICATIONS

Extended European Search Report, dated Jan. 22, 2014, in corresponding European Application No. 11860611.0 (6 pp.).

Primary Examiner — Ricky Ngo
Assistant Examiner — Stephen Steiner
(74) Attorney, Agent, or Firm — Staas & Halsey LLP

(57) ABSTRACT

Embodiments of the present invention relate to the communications field, and provide a multi-chassis cascading apparatus. The apparatus includes a line card chassis LCC, where a fabric interface chip FIC and a switch element SE 1/3 are deployed in each line card chassis LCC; the fabric interface chip FIC is connected to the switch element SE 1/3 that is located in the same line card chassis LCC as the fabric interface chip FIC is; and a switch element SE 2 is deployed in each line card chassis LCC; the switch element SE 1/3 is connected to the switch element SE 2 that is located in the same line card chassis LCC as the switch element SE 1/3 is; and the switch element SE 1/3 is connected to the switch element SE 2 that is located in another line card chassis LCC.

5 Claims, 6 Drawing Sheets

(56) References Cited

U.S. PATENT DOCUMENTS

2011/0038371 A1    2/2011   Lin
2012/0045206 A1    2/2012   Sindhu

FOREIGN PATENT DOCUMENTS

CN    101146037 A    3/2008
CN    101296186 A    10/2008
CN    101631081 A    1/2010

\* cited by examiner

MULTI-CHASSIS CASCADING APPARATUS

CROSS-REFERENCE TO RELATED APPLICATIONS

This application is a continuation of International Application No. PCT/CN2011/078785, filed on Aug. 23, 2011, which is hereby incorporated by reference in its entirety.

FIELD OF THE INVENTION

Embodiments of the present invention relate to the communications field, and in particular, to a multi-chassis cascading apparatus.

BACKGROUND OF THE INVENTION

An SF (Switch Fabric, switch fabric) is formed by multiple SEs (Switch Element, switch element) and FICs (Fabric Interface Chip, fabric interface chip). The SE and the FIC are located in a Switch Card (switch board or switch card for short) and an LC (Line Card, line card), respectively. An Ingress FIC (ingress fabric interface chip) in an Ingress LC (ingress line card) sends a data packet to the SE. Each SE can switch or distribute the received data packet to a connected next-level SE. The last-level SE sends the data packet to an Egress FIC (egress fabric interface chip) in an Egress LC (egress line card).

In a multi-level data switching system in the prior art, an FIC and an SE 1/3 are located in an LCC (Line Card Chassis, line card chassis), and SE 2 is located in an FCC (Fabric Card Chassis, fabric card chassis). Both working modes of an SE 1 and an SE 3 are integrated in the SE 1/3, and the two working modes coexist in the SE. In such a system, the FCC is generally connected to the LCC through a fiber or an electric cable. The SE 1 in the LCC distributes the packets, which are sent by the Ingress FIC, to different SEs 2 in the FCC; and the SE 2 switches the data packet into a destination LCC according to information carried in the data packet; finally, the SE 3 of the destination LCC switches the received data packet into the Egress FIC. Data packets between all the FICs in the system need to pass through SE 1, SE 2, and SE 3 in sequence before arriving at the Egress FIC.

In the foregoing multi-chassis data switch fabric, in order to implement cascading of multiple LCCs, a user needs to buy and configure the FCC, which increases costs.

In the prior art, two-chassis cascading may also be implemented through back-to-back interconnection of two LCCs directly. However, the cascading method is suitable for cascading of two chassis only, and cannot be used for cascading of three or more chassis.

SUMMARY OF THE INVENTION

An embodiment of the present invention provides a multi-chassis cascading apparatus to implement cascading of three or more chassis without an FCC.

To achieve the foregoing objective, the embodiments of the present invention employ the following technical solution:

A multi-chassis cascading apparatus includes line card chassis LCCs, where fabric interface chips FICs are deployed in each line card chassis LCC, and further includes:

switch elements SEs 1/3 and switch elements SEs 2 that are deployed in each line card chassis LCC; where a fabric interface chip FIC in the fabric interface chips FICs is connected to a switch element SE 1/3 that is located in the same line card chassis LCC as the fabric interface chip FIC in the switch elements SEs 1/3;

a switch element SE 1/3 is connected to a switch element SE 2 that is located in the same line card chassis LCC as the switch element SE 1/3 in the switch elements SEs 2; and the switch element SE 1/3 is connected to a switch element SE 2 that is located in a line card chassis LCC different from the LCC in which the switch element SE 1/3 is located in the switch elements SEs 2.

The multi-chassis cascading apparatus provided in the embodiment of the present invention includes the line card chassis LCC in which the fabric interface chip FIC, the switch element SE 1/3, and the switch element SE 2 are set, where the fabric interface chip FIC is connected to the switch element SE 1/3 that is located in the same LCC as the fabric interface chip FIC is, and the switch element SE 1/3 is connected to both the switch element SE 2 that is located in the same line card chassis LCC as the switch element SE 1/3 is, and the switch element SE 2 that is located in the line card chassis LCC different from the LCC in which the switch element SE 1/3 is located. In comparison with the prior art, in the embodiment of the present invention, the switch element SE 2 is deployed in the line card chassis LCC in which the switch element SE 1/3 is located, and multiple chassis are cascaded through the intra-chassis connection and inter-chassis connection between the switch element SE 1/3 and the switch element SE 2, which avoids purchase and configuration of a fabric card chassis FCC exclusively used for placing the switch element SE 2, reduces the number of fibers, lowers costs, and meanwhile enables cascading of three or more chassis.

BRIEF DESCRIPTION OF THE DRAWINGS

To illustrate the technical solution of the present invention or the prior art more clearly, accompanying drawings used in the description of the embodiments of the present invention or the prior art are introduced briefly in the following. Apparently, the accompanying drawings described below are only some embodiments of the present invention, and persons of ordinary skill in the art can derive other drawings according to these embodiments without making creative efforts.

DETAILED DESCRIPTION OF THE EMBODIMENTS

The technical solutions in the embodiments of the present invention are described clearly and completely in the following in combination with the accompanying drawings. Evidently, the drawings and the described embodiments are part of rather than all of the embodiments of the present invention. All other embodiments, which are derived by those skilled in the art based on the embodiments of the present invention without making creative efforts, shall fall within the protection scope of the present invention.

Figure 1:
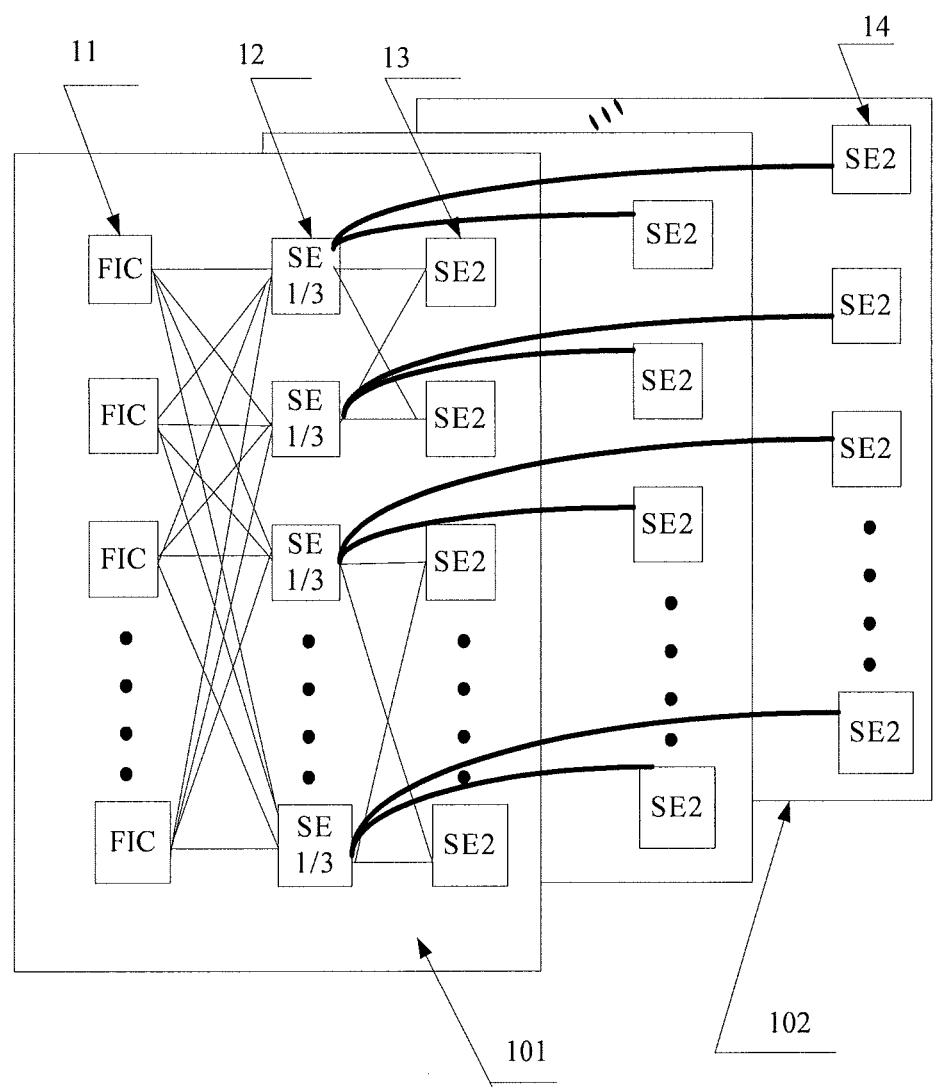
FIG. 1 is a schematic diagram of a multi-chassis cascading apparatus according to an embodiment of the present invention.

An embodiment of the present invention provides a multi-chassis cascading apparatus. As shown in FIG. 1, the apparatus includes all cascaded LCCs. In the multi-chassis cascading apparatus, the first cascaded LCC is represented by LCC 101, and the $n^{th}$ cascaded LCC is represented by LCC 102. An interconnection manner of an apparatus on the LCC 101 is used for detailed description here, and line interconnection manners in other LCCs are the same as that in the LCC 101.

An FIC 11, SEs 1/3-12, and SEs 2-13 are deployed in the LCC 101; and the FIC 11 is connected to the SE 1/3-12 that is located in the same LCC 101 as the FIC 11 is; the SE 1/3-12 is connected to the SE 2-13 that is located in the same LCC 101 as the SE 1/3-12 is; and the SE 1/3-12 is connected to an SE 2-14 which is not located in the LCC 101.

In this way, the SE 2 may be located in the LCC, and the SE 1/3 is connected to the SE 2 in the same chassis and connected to the SE 2 in a different chassis, thereby implementing multi-chassis cascading, avoiding purchase and configuration of an FCC exclusively used for placing the SE 2, and lowering costs. This cascading manner supports not only cascading of two chassis, but also cascading of three or more chassis.

Specially, for clearness of the lines, FIG. 1 shows only an interconnection manner of an apparatus in the LCC 101 for detailed illustration. Line interconnection manners in other LCCs are the same as that in the LCC 101, and are not marked in FIG. 1. Meanwhile, the line interconnection method in FIG. 1 is exemplary only. The numbers of FICs, SEs 1/3 and SEs 2 and the methods of connecting the SE 1/3 to the SE 2 in the same LCC and to the SE 2 in a different LCC need to be decided according to the number of cascaded chassis, the numbers of SEs 1/3 and SEs 2, and the specific form of the switch card. Therefore, the line interconnection method in FIG. 1 does not represent line interconnection methods of all the cascading apparatuses. Each FIC may be connected to all SEs 1/3 that are located in the same LCC as this FIC is, or may be connected to a pre-specified part of SEs 1/3. Meanwhile, the connection between the SE 1/3 and the SE 2 in the same LCC may be a many-to-one connection relationship or a one-to-many connection relationship.

It should be noted that, the SE in this embodiment may be a chip, component or mini system. The SE 2-14 is located in the LCC 102, which indicates the SE 2-14 is located in the $n^{th}$ cascaded LCC. The number appended to the LCC in this embodiment does not represent the order of cascading the LCCs, but is used for ease of description only.

In practical application, the connection between the FIC and the SE 1/3, and the connection between the SE 1/3 and the SE 2, may be connection through on-card cabling, an electric backplane, an electric cable, or a fiber. Preferably, in this embodiment, the following interconnection manner is adopted:

The FIC is connected, through an electric backplane, to the SE 1/3 that is located in the same LCC as the FIC is; the SE 1/3 is connected, through on-card cabling, to the SE 2 that is located in the same LCC as the SE 1/3 is; and the SE 1/3 is connected, through a fiber, to the SE 2 located in an LCC different from the LCC in which the SE 1/3 is located.

In this way, fiber interconnection is adopted for the link between the SE 1/3-12 and the SE 2-14, and the link between the SE 1/3-12 and the SE 2-13 is on-card cabling. In comparison with the prior art, in such interconnection manner, the link between the SE 1/3-12 and the SE 2-13 is no longer a fiber, which reduces the number of fibers for interconnection between chassis, and further lowers costs.

An optical-electric conversion device is deployed in a fiber port for connecting the line, which is covered in the prior art and therefore is not detailed here any further.

Figure 2:
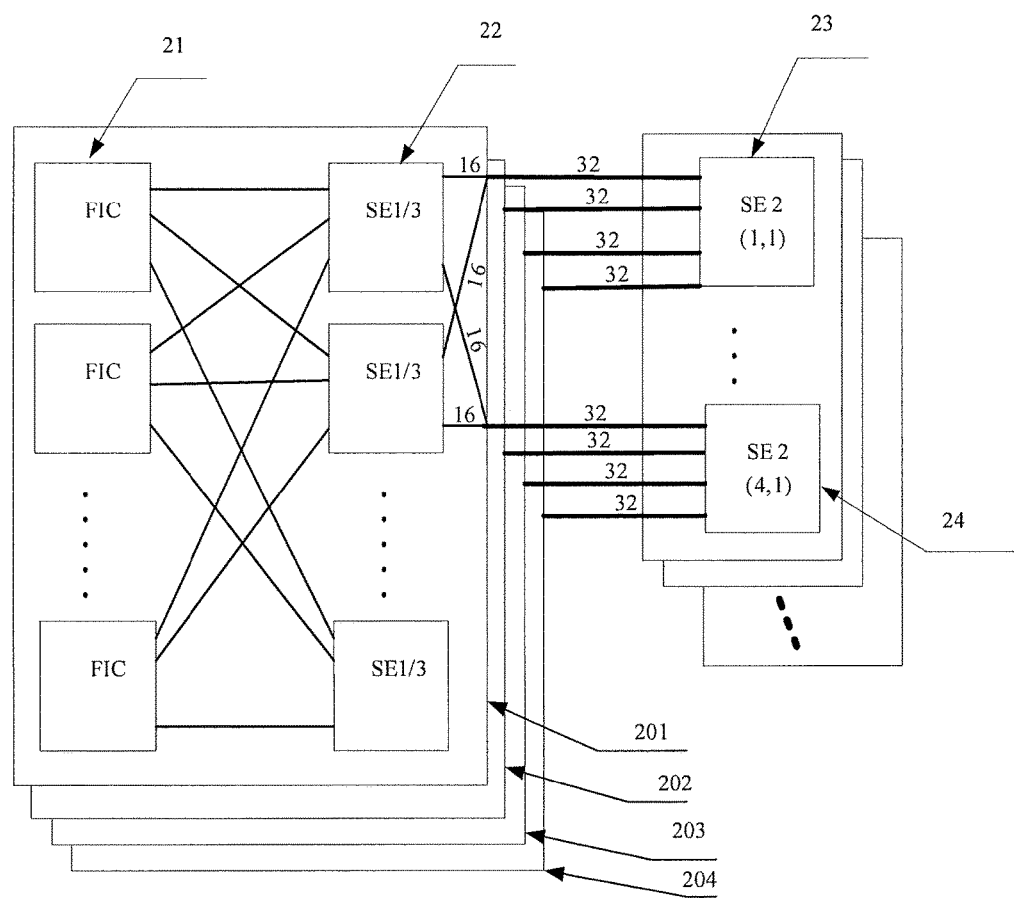
FIG. 2 is a schematic diagram of a 4-chassis cascading apparatus according to an embodiment of the present invention.

The illustration in FIG. 1 is for ease of observing the interconnection manner of the multi-chassis cascading apparatus, and the illustration in FIG. 2 is more helpful to those skilled in the art for understanding the present invention. The number of FICs, SEs 1/3, and SEs 2, the connection between the FIC and the SE 1/3, and the connection between the SE 1/3 and the SE 2 need to be decided according to the specific cascading condition. A case of 4-chassis cascading is illustrated here, with an SE capable of 128×128 switching as an example. Any person skilled in the art can easily make variations or replacements in other cases from this embodiment.

It should be noted that, the SE capable of 128×128 switching refers to a chip or component or mini system connectible to 128 links, with each link having functions of sending and receiving.

In the 4-chassis cascading apparatus in FIG. 2, each LCC may have 32 FICs, 16 SEs 1/3, and 8 SEs 2. Therefore, the multi-chassis cascading apparatus has 128 FICs, 64 SEs 1/3, and 32 SEs 2 in total.

For example, the 4-chassis cascading apparatus includes an LCC 201, LCC 202, LCC 203, and LCC 204. An interconnection manner of an apparatus in the LCC 201 is used for detailed illustration here and line interconnection manners in other LCCs are the same as that in the LCC 201. Each FIC 21 located in the LCC 201 has 32 links connected to each SE 1/3-22, and each FIC 21 is connected to all SEs 1/3-22 located in the same LCC 201. Every two SEs 1/3-22 in the LCC 201 are connected to one SE 2-23 located in the LCC 201, and there are 16 links that connect each SE 1/3-22 and the SE 2-23 that is connected to the SE 1/3-22. Meanwhile, every two SEs 1/3-22 in the LCC 201 are connected to one SE 2-24 not located in the LCC 201, and there are 16 links that connect each SE 1/3-22 and the SE 2-24 that is connected to the SE 1/3-22. It should be noted that, as regards the 4-chassis cascading apparatus in this embodiment, there are 16 links that connect each SE 1/3-22 located in the LCC 201 and each connected SE 2 (FIG. 3 marks the SE-23 only) in other 3 LCCs in the 4-chassis cascading apparatus. That is, 48 links in total are connected to the SE 2 that is not located in LCC 201, and every two SEs 1/3-22 located in the LCC 201 are connected to one SE 2 that is not located in the LCC 201. In this way, each SE 2-23 located in the LCC 201 has 128 links in total connected to SEs 1/3 (FIG. 3 marks the SE 1/3-22 only) in 4 LCCs.

It should be noted that, when every two SEs 1/3-22 located in the LCC 201 in this embodiment are connected to one SE 2 located in the LCC 201, the connection does not have a sequence so long as two SEs 1/3-22 have 32 links in total connected to one SE 2 located in the LCC 201. When every two SEs 1/3-22 located in the LCC 201 are connected to one SE 2 that is not located in the LCC 201, the connection does not have a sequence so long as two SEs 1/3-22 have a total of 32 links connected to one SE 2 that is not located in the LCC 201. Meanwhile, the serial number (i, j) of the SE 2 in FIG. 2 indicates that the SE 2 is the $j^{th}$ SE 2 in the LCCi. In FIG. 2, the SEs 2 of a same serial number j are grouped into one group intentionally, which forms 4 virtual chassis 30. These virtual chassis (not marked in FIG. 2) including SEs 2 are equivalent to FCCs in the prior art. In this way, each SE 2 located in the virtual chassis has 32 links connected to the LCC 201, the LCC 202, the LCC 203, and the LCC 204 each.

Specially, in each LCC, the FIC, the SE 1/3 and the SE 2 may be located in a same integrated switch card. In practical application, however, an LC is deployed in the LCC, and the LC may include one or more fabric interface chips FTC In each LCC, a switch card may be set, and the SE 1/3 and the SE 2 are deployed in the switch card. In this way, in one LCC, one or more FICs are deployed in one LC, and all SEs are deployed in multiple switch cards. Therefore, all devices in the LCC may be installed in order, and the installation becomes more convenient and faster and is implemented easily.

Figure 3:
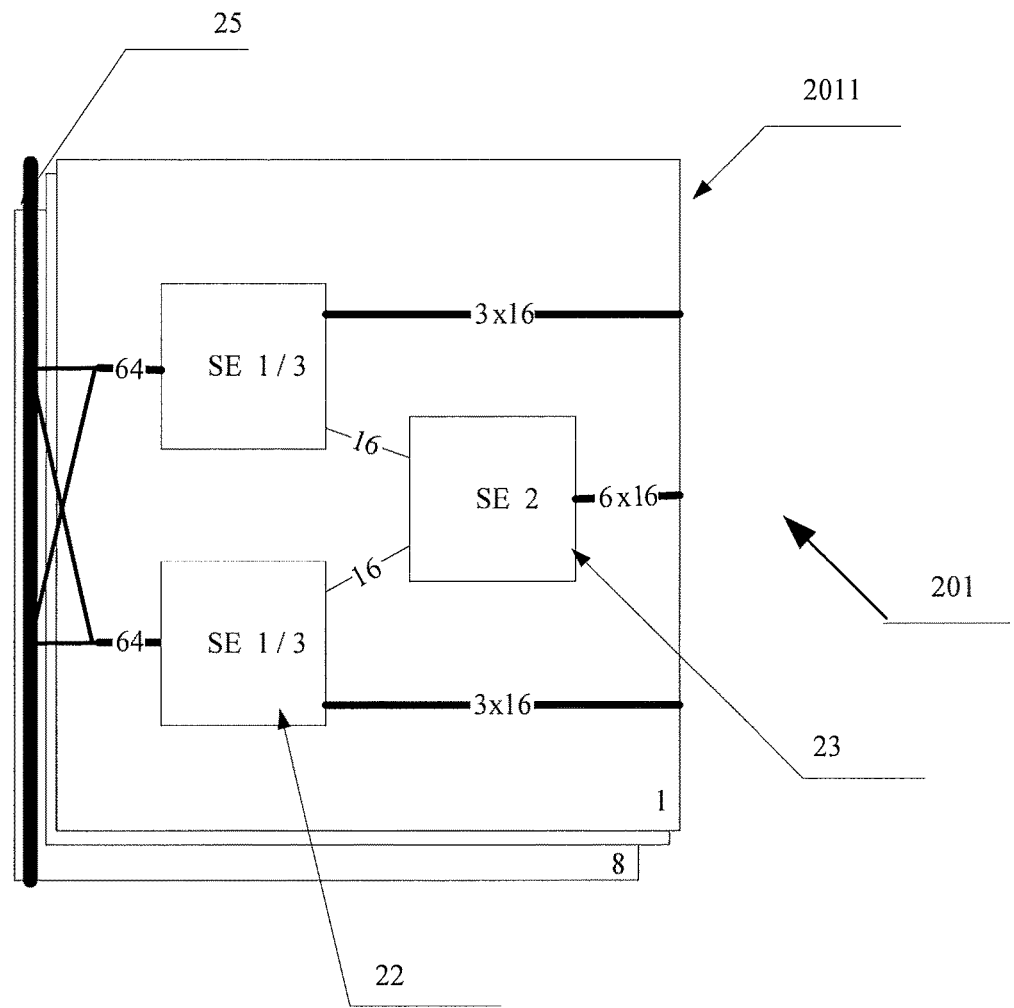
FIG. 3 is a schematic structural diagram of an LCC part of the 4-chassis cascading apparatus according to FIG. 2.

Further, FIG. 3 is a schematic structural diagram of a part of the LCC 201 in the 4-chassis cascading apparatus shown in FIG. 2. The LCC 201 includes 8 switch cards (FIG. 3 marks a switch card 2011 only), and the 8 switch cards are connected through an electric backplane 25. Each switch card has 2 SEs 1/3-22 and 1 SE 2-23. The switch card 2011 is taken as an example here, and interconnection manners of other switch cards are the same as that of the switch card 2011. Every two SEs 1/3-22 in the switch card 2011 are connected to one SE 2-23, there are 16 links that connect each SE 1/3-22 and the SE 2-23 that is connected to the SE 1/3-22, there are 64 links in total that connect each SE 1/3-22 and all FICs (not designated in FIG. 3), and each SE 1/3-22 has 48 links for interconnection between chassis. In this way, every two SEs 1/3-22 has 32 links connected to the SE 1/3-22, 96 links are used for interconnection between chassis, and each SE 1/3-22 has 96 links for interconnection between chassis. Therefore, the switch card 2011 has 192 links for interconnection between chassis.

Figure 4:
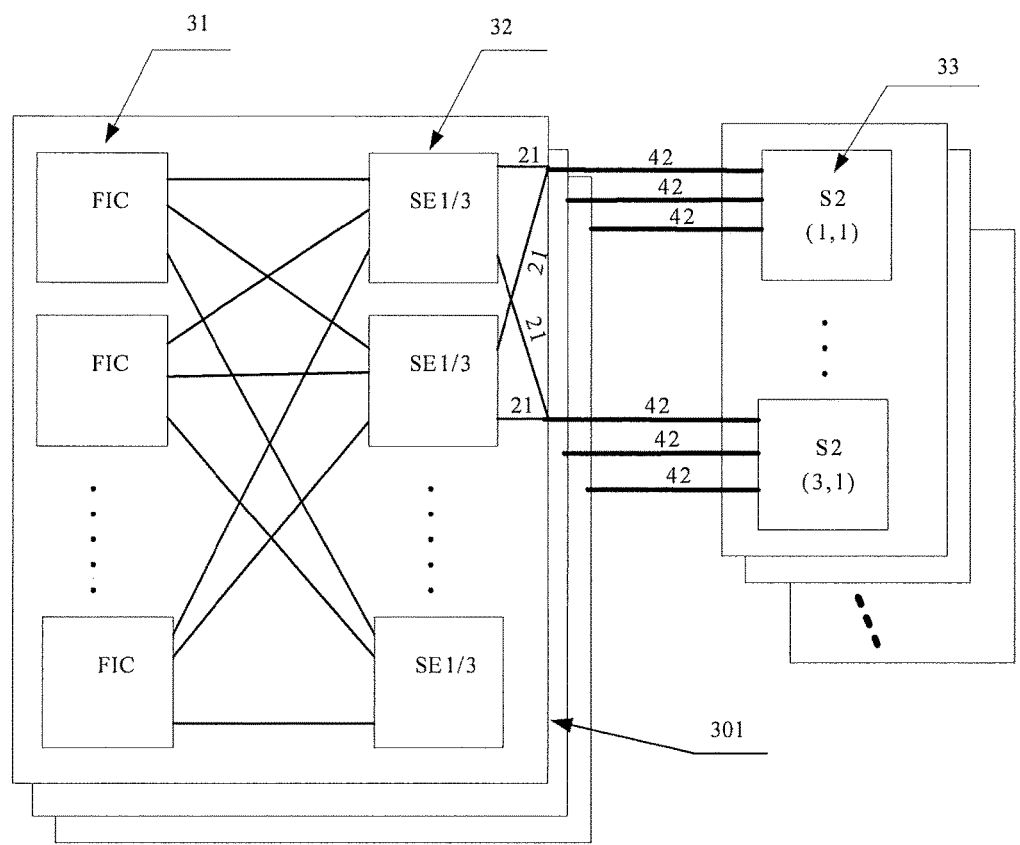
FIG. 4 is a schematic diagram of a 3-chassis cascading apparatus according to an embodiment of the present invention.

FIG. 4 illustrates a case of 3-chassis cascading, taking an SE of a chip of 128×128 switching as an example. In the 3-chassis cascading apparatus in FIG. 4, each LCC may have 32 FICs, 16 SEs 1/3, and 8 SEs 2. Therefore, the 3-chassis cascading apparatus has 96 FICs, 48 SEs 1/3, and 24 SEs 2 in total. Certainly, any person skilled in the art may change the numbers of FICs, SEs 1/3, and SEs 2 according to specific conditions. For ease of description, the numbers of FICs, SEs 1/3, and SEs 2 are used in this embodiment, which does not mean that the numbers of the FICs, SEs 1/3, and SEs 2 are fixed.

An interconnection manner of an apparatus in the LCC 301 is used for detailed illustration here, and line interconnection manners in other LCCs are the same as that in the LCC 301. Each FIC 31 in the LCC 301 have 32 links connected to each SE 1/3-32, and each FIC 31 is connected to all SEs 1/3-32 located in the same LCC 301. Every two SEs 1/3-32 in the LCC 301 are connected to one SE 2-33 located in the LCC 301, and there are 21 links that connect each SE 1/3-32 and the SE 2-33 that is connected to the SE 1/3-32. Meanwhile, every two SEs 1/3-32 are connected to one SE 2 (not designated in FIG. 4) not located in the LCC 301, and each SE 1/3-32 has 21 links connected to the SE 2 that is connected to the SE 1/3-32 and not located in the LCC 301. In this way, each SE 2-33 located in the LCC 301 has 126 links in total connected to SEs 1/3 (FIG. 4 marks the SE 1/3-32 only) located in 3 LCCs in the 3-chassis cascading apparatus.

It should be noted that, the connection form that every two SEs 1/3-32 located in the LCC 301 in this embodiment are connected to one SE 2-33 located in the LCC 301 does not have a sequence, so long as each of the two SEs 1/3-32 has 21 links connected to one SE 2-33. When every two SEs 1/3-32 located in the LCC 101 are connected to one SE 2 that is not located in the LCC 301, the connection does not have a sequence so long as each of two SEs 1/3-32 has 21 links connected to one SE 2 that is not located in the LCC 301. Although 126 of the 128 links of the SE 2 are in use, the SEs of 128×128 switching are used for 3-chassis cascading, and therefore, the link utilization ratio is very high in this interconnection manner.

To connect all links in the case of 3-chassis cascading, SEs of 144×144 switching may be used for cascading, and therefore, each SE 1/3 may be connected to SEs 2 through 48 links. Any person skilled in the art can replace the SE according to specific conditions, and the replacement is not detailed here any further.

Specially, to seek the maximum performance, n-chassis cascading may be performed on SEs of S×S switching according to the following principle: the link connection ensures that each SE 2 has m links connected to one LCC, m=⌊S/n⌋, and m is a value obtained by rounding down S/n. In practical application, without the intention of seeking high performance, fewer links may also be used for connection.

Figure 5:
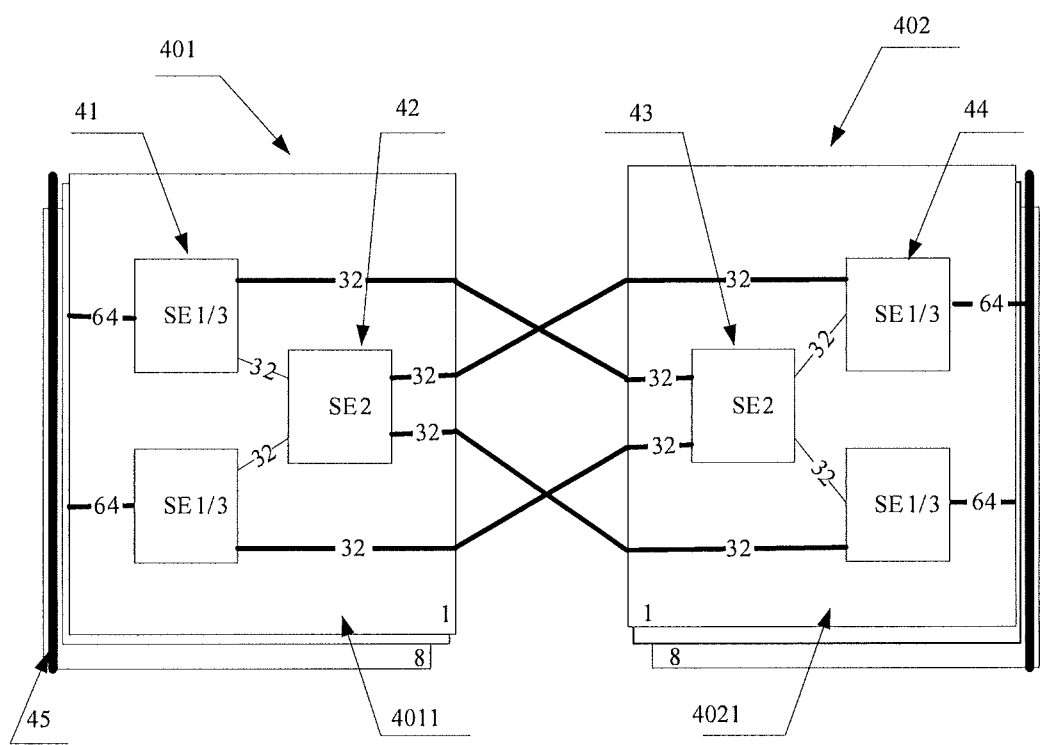
FIG. 5 is a schematic diagram of a back-to-back cascading apparatus according to an embodiment of the present invention.

It should be noted that, the embodiments of the present invention come in many forms. Those skilled in the art can make improvement according to the principles of the present invention and on the basis of the prior art. Here back-to-back cascading in an embodiment of the present invention is taken as an example for illustration. As shown in FIG. 5, the back-to-back cascading apparatus includes an LCC 401 and an LCC 402. The LCC 401 includes 8 switch cards, and the LCC 402 also includes 8 switch cards (FIG. 5 marks a switch card 4011 and a switch card 4021 only). Each switch card has 16 FICs, 2 SEs 1/3, and 1 SE 2. The connection between the switch card 4011 and the switch card 4021 is taken as an example here, and other switch cards are connected in the same interconnection manner.

There are 32 links connecting each SE 1/3-41 located in the switch card 4011 and the SE 2-42 in this card, and there are 32 links connecting each SE 1/3-41 to the SE 2-44 located in the switch card 4021, and two SEs 1/3-41 are connected to one SE 2-42. Meanwhile, two SEs 1/3-41 are connected to one SE 2-44. Likewise, there are 32 links connecting each SE 1/3-43 located in the switch card 4021 and the SE 2-44 in this card, and there are 32 links connecting to the SE 2-42 located in the switch card 4011, and two SEs 1/3-43 are connected to one SE 2-44. Meanwhile, two SEs 1/3-43 are connected to one SE 2-42. Specially, in the back-to-back cascading apparatus, two SEs 1/3-41 in the switch card 4011 each have 64 links connected, through an electric backplane 45, to the FIC (not designated in FIG. 5), and in other switch cards, such interconnection manner is also adopted. In this way, it is regarded that the LCC 401 includes two small LCCs, and the LCC 402 includes two small LCCs. Therefore, the back-to-back cascading apparatus is equivalent to a 4-chassis cascading apparatus, which saves two LCCs and lowers costs.

Figure 6:
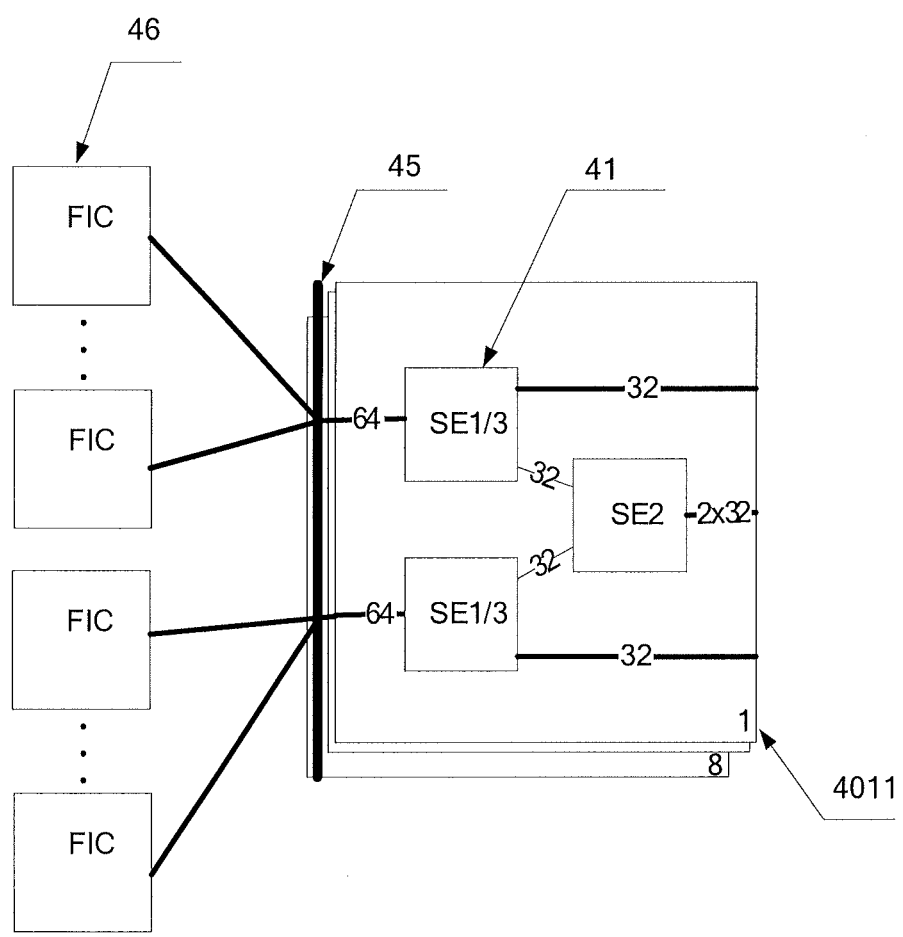
FIG. 6 is a schematic structural diagram of an LCC part of the back-to-back cascading apparatus according to FIG. 5.

Specially, FIG. 6 shows the interconnection manner between an FIC and an SE 1/3 in the LCC shown in FIG. 5. FIG. 6 takes the switch card 4011 as an example, and the interconnection manners between the FIC and the SE 1/3 in other switch cards are the same as that of the switch card 4011. The 1st FIC 46 to the 8th FIC 46 and the 9th FIC 46 to 16th FIC 46 are connected, through the electric backplane 45, to two different SEs 1/3-41 separately, that is, the SEs 1/3-41 in switch card 4011 each are connected to a half of the FICs 46. In this way, no cross connection is required between the SE 1/3-41 and the electric backplane 45, and the interconnection manner is simple.

The above descriptions are only specific implementation manners of the present invention, but not intended to limit the protection scope of the present invention. Variations or replacement that can be easily derived by those skilled in the art within the technical scope disclosed by the present invention shall fall within the protection scope of the present invention. Therefore, the protection scope of the present invention is subject to the appended claims.

What is claimed is:

1. A multi-chassis cascading apparatus, comprising:
   a plurality of line card chassis (LCCs) including at least a first LCC and a second LCC, each LCC among the plurality of LCCs comprising:
      a plurality of fabric interface chips (FICs);
      a plurality of switch elements (SEs) 1/3; and
      a plurality of SEs 2, wherein:
         a first FIC among the plurality of FICs of the first LCC is directly connected to a first SE 1/3 among the plurality of SEs 1/3 of the first LCC and a second SE 1/3 among the plurality of SEs 1/3 of the first LCC, and the first FIC being configured to perform signal egress out of the multi-chassis cascading apparatus with the first SE 1/3 and the second SE 1/3,
         a second FIC among the plurality of FICs of the first LCC is directly connected to the first SE 1/3 and the second SE 1/3, the second FIC being configured to perform signal ingress into the multi-chassis cascading apparatus with the first SE 1/3 and the second SE 1/3,
         the first SE 1/3 is connected via on-card cabling to a first SE 2 among the plurality of SEs 2 of the first LCC and the second SE 1/3 is connected to the first SE 2, and
         the first SE 1/3 is connected via fiber to a second SE 2 among the plurality of SEs 2 of the second LCC, and the second SE 1/3 is connected to the second SE 2.

2. The multi-chassis cascading apparatus according to claim 1,
   wherein the first FIC and the second FIC are connected, through an electric backplane, to the first SE 1/3 and the second SE 1/3;
   wherein the first SE 1/3 and the second SE 1/3 are connected, through on-card cabling, to the first SE 2; and
   wherein the first SE 1/3 and the second SE 1/3 are connected, through a fiber, to the second SE 2.

3. The multi-chassis cascading apparatus according to claim 1, wherein at least one line card (LC) is deployed in the first LCC, and the first FIC and the second FIC are located in a LC among the at least one line card LC.

4. The multi-chassis cascading apparatus according to claim 1, wherein at least one switch card is deployed in the first LCC, and the first SE 1/3, the second SE 1/3, and the first SE 2 are located in a switch card among the at least one switch card.

5. The multi-chassis cascading apparatus according to claim 1, wherein each LCC of the plurality of LCCs includes at least one FIC, at least one SE 1/3, and at least one SE 2 in a same integrated switch card.

* * * * *